United States Patent
Jamadagni et al.

(10) Patent No.: US 8,923,268 B2
(45) Date of Patent: Dec. 30, 2014

(54) METHOD AND SYSTEM FOR BULK ACTIVATION/DEACTIVATION OF COMPONENT CARRIERS IN A WIRELESS NETWORK ENVIRONMENT

(75) Inventors: Satish Nanjunda Swamy Jamadagni, Bangalore (IN); Nitin Jain, Bangalore (IN)

(73) Assignee: Samsung Electronics Co., Ltd (KR)

( * ) Notice: Subject to any disclaimer, the term of this patent is extended or adjusted under 35 U.S.C. 154(b) by 123 days.

(21) Appl. No.: 13/697,733

(22) PCT Filed: May 13, 2011

(86) PCT No.: PCT/KR2011/003571
§ 371 (c)(1),
(2), (4) Date: Nov. 13, 2012

(87) PCT Pub. No.: WO2011/142634
PCT Pub. Date: Nov. 17, 2011

(65) Prior Publication Data
US 2013/0064185 A1    Mar. 14, 2013

(30) Foreign Application Priority Data
May 13, 2010   (IN) .......................... 1360/CHE/2010

(51) Int. Cl.
*H04L 1/00* (2006.01)
*H04L 5/00* (2006.01)
*H04L 27/00* (2006.01)

(52) U.S. Cl.
CPC .............. *H04L 5/001* (2013.01); *H04L 5/0098* (2013.01); *H04L 5/0037* (2013.01); *H04L 5/0042* (2013.01); *H04L 5/0092* (2013.01); *H04L 27/0006* (2013.01)
USPC ........................................................ 370/343

(58) Field of Classification Search
USPC ........................................ 370/328, 329, 343
See application file for complete search history.

(56) References Cited

U.S. PATENT DOCUMENTS

| | | | |
|---|---|---|---|
| 2008/0008229 A1 | 1/2008 | Hamabe et al. | |
| 2011/0243048 A1* | 10/2011 | Wang et al. | 370/311 |
| 2013/0010611 A1* | 1/2013 | Wiemann et al. | 370/242 |
| 2013/0136015 A1* | 5/2013 | Ojala et al. | 370/252 |

FOREIGN PATENT DOCUMENTS

| | | |
|---|---|---|
| JP | 2008017074 | 1/2008 |
| KR | 1020090038325 | 4/2009 |
| WO | WO2007059706 | 5/2007 |
| WO | WO2007068198 | 6/2007 |

OTHER PUBLICATIONS

PCT/ISA/237 Written Opinion issued on PCT/KR2011/003571 (pp. 5).
PCT/ISA/210 Search Report issued on PCT/KR2011/003571 (pp. 3).

* cited by examiner

*Primary Examiner* — Kerri Rose
(74) *Attorney, Agent, or Firm* — The Farrell Law Firm, P.C.

(57) ABSTRACT

Method and apparatus are provided for communicating availability and removal of one or more CCs in a cell. The one or more CCs that are available in the cell of a wireless communication network are determined, or a need to release one or more CCs that are active in the cell of a wireless communication network is detected. Availability of or the need to release the one or more CCs in the cell is communicated to a plurality of mobile stations. Each of the plurality of mobile stations is allowed to use or de-activate the one or more CCs in the cell.

16 Claims, 5 Drawing Sheets

METHOD AND SYSTEM FOR BULK ACTIVATION/DEACTIVATION OF COMPONENT CARRIERS IN A WIRELESS NETWORK ENVIRONMENT

PRIORITY

This application is a National Phase Entry of PCT International Application No. PCT/KR2011/003571, which was filed on May 13, 2011, and claims priority to Indian Patent Application No. 1360/CHE/2010 filed in the Indian Intellectual Property Office on May 13, 2010, the contents of which are incorporated herein by reference.

BACKGROUND OF THE INVENTION

1. Field of the Invention

The present invention relates generally to the field of wireless communication, and more particularly, to activating and deactivating Component Carriers (CCs) in a wireless network environment.

2. Description of the Related Art

Recently, in wireless communication technologies, such as, for example, Long Term Evolution (LTE)/LTE Advanced (LTE-A), carrier aggregation has been introduced such that two or more CCs are aggregated in order to support wider transmission bandwidths of up to 100 MHz, and for spectrum aggregation. The carrier aggregation technique enables configuration of a user equipment to aggregate a different number of CCs originating from the same enhanced Node B (eNB or eNodeB) and a different number of possibly different bandwidths in uplink and downlink.

For an LTE-A cell, CCs in an LTE-A system may be pre-allocated or could be made available due to spectrum farming. As users migrate from $2^{nd}$ Generation/$3^{rd}$ Generation (2G/3G) towards LTE-A, spectrum from Global System for Mobile Communications (GSM) Enhanced Data rates for GSM Evolution (EDGE) Radio Access Network/Universal Terrestrial Radio Access Network (GERAN/UTRAN) cells could be made available to the LTE-A cells at a certain point in time based on the control of an operator.

Spectrum farming can be facilitated due to a mix of user type penetrations, as well as when users in GERAN/UTRAN bands reduce in number. Also, parameters such as changing usage patterns, like a greater number of voice calls during office hours, and more broadcasting of multimedia during non-office hours, also provide opportunities for an operator to farm available spectrum from legacy Radio Access Technologies (RATs) and make the same available to the LTE-A cells for carrier aggregation.

Operators might also farm spectrum that is made available to femto cells, where the femto cells can relinquish brands when not using the same. Operators can also provision time based spectrum allocation to femto cells which when not used could be used as Component Carriers (CCs) in macro cells.

However, when the CCs are made available to an LTE-A cell due to spectrum farming, there is no provision to announce availability of carrier components in a cell. As a result, the mobile stations may be unaware of the newly available CCs.

SUMMARY OF THE INVENTION

The present invention has been made to address at least the above problems and/or disadvantages and to provide at lest the advantages described below. Accordingly, an aspect of the present invention provides a method and system for bulk activation and deactivation of CCs in a wireless communication environment.

According to one aspect of the present invention, a method is provided for communicating availability of one or more CCs in a cell. The one or more CCs that are available in the cell of a wireless communication network are determined. Availability of the one or more CCs in the cell is communicated to a plurality of mobile stations. Each of the plurality of mobile stations is allowed to use the one or more CCs in the cell.

According to another aspect of the present invention, an article of manufacture is provided for communicating availability of one or more CCs in a cell. The article of manufacture includes a non-transitory computer-readable storage medium having instructions stored therein, which when executed, implements the steps of: determining the one or more CCs that are available in the cell of a wireless communication network; communicating availability of the one or more CCs in the cell to a plurality of mobile stations; and allowing each of the plurality of mobile stations to use the one or more CCs in the cell.

According to an additional aspect of the present invention, an apparatus is provided for communicating availability of one or more CCs in a cell. The apparatus includes a memory configured to temporarily store instructions. The apparatus also includes at least one processor coupled to the memory and operative to: (i) determine the one or more CCs that are available in the cell of a wireless communication network; (ii) communicate availability of the one or more CCs in the cell to a plurality of mobile stations; and (iii) allow each of the plurality of mobile stations to use the one or more CCs in the cell.

According to a further aspect of the present invention, a method is provided for communicating removal of CCs in a cell. A need to release one or more CCs that are active in the cell of a wireless communication network is detected. The need to release the one or more CCs in the cell is communicated to a plurality of mobile stations. Each of the plurality of mobile stations is allowed to de-activate the one or more CCs in the cell.

According to another aspect of the present invention, an article of manufacture is provided for communicating removal of CCs in a cell. The article of manufacture includes a non-transitory computer-readable storage medium having instructions stored therein, which when executed, implement the steps of: detecting a need to release one or more CCs that are active in the cell of a wireless communication network; communicating the need to release the one or more CCs in the cell to a plurality of mobile stations; and allowing each of the plurality of mobile stations to de-activate the one or more CCs in the cell.

According to another aspect of the present invention, an apparatus is provided for communicating removal of CCs in a cell. The apparatus includes a memory configured to temporarily store instructions. The apparatus also includes at least one processor coupled to the memory and operative to: (i) detect a need to release one or more CCs that are active in the cell of a wireless communication network; (ii) communicate the need to release the one or more CCs in the cell to a plurality of mobile stations; and (iii) allow each of the plurality of mobile stations to de-activate the one or more CCs in the cell.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
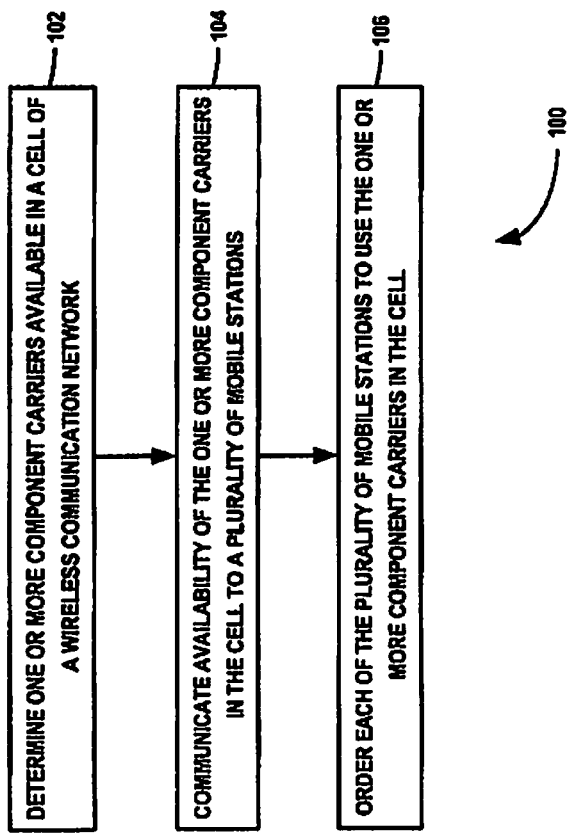
FIG. 1 is a flowchart illustrating a method of bulk activation of CCs in a wireless communication environment, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The drawings described herein are for illustration purposes only and are not intended to limit the scope of the present disclosure in any way.

The present invention provides a method and system for bulk activation and deactivation of CCs in a wireless communication environment. Therefore, mobile stations in the system can be aware of the newly available CCs. As a result, overall throughput of the system can be enhanced.

FIG. 1 is a flowchart 100 illustrating a method of bulk activation of CCs in a wireless communication environment, according to an embodiment of the present invention. In step 102, a determination of availability of CC(s)s in a cell (e.g., of a different RAT) of a wireless communication network is performed. The CCs are determined as available by farming spectrum associated with a cell of a different RAT. If the spectrum is available, the same spectrum is used as CC(s) in a macro cell.

Once it is determined that the CC(s) are available for use by mobile station(s) associated with an LTE-A cell, step 104 is performed. In step 104, availability of the CC(s) in the cell is communicated to the mobile stations. In an embodiment of the present invention, the availability of CC(s) in the cell is communicated in a system information block, as described below with reference to FIG. 2. In step 106, each of the mobile stations is ordered to use the newly available CC(s) in the cell for data transmission.

Figure 2:
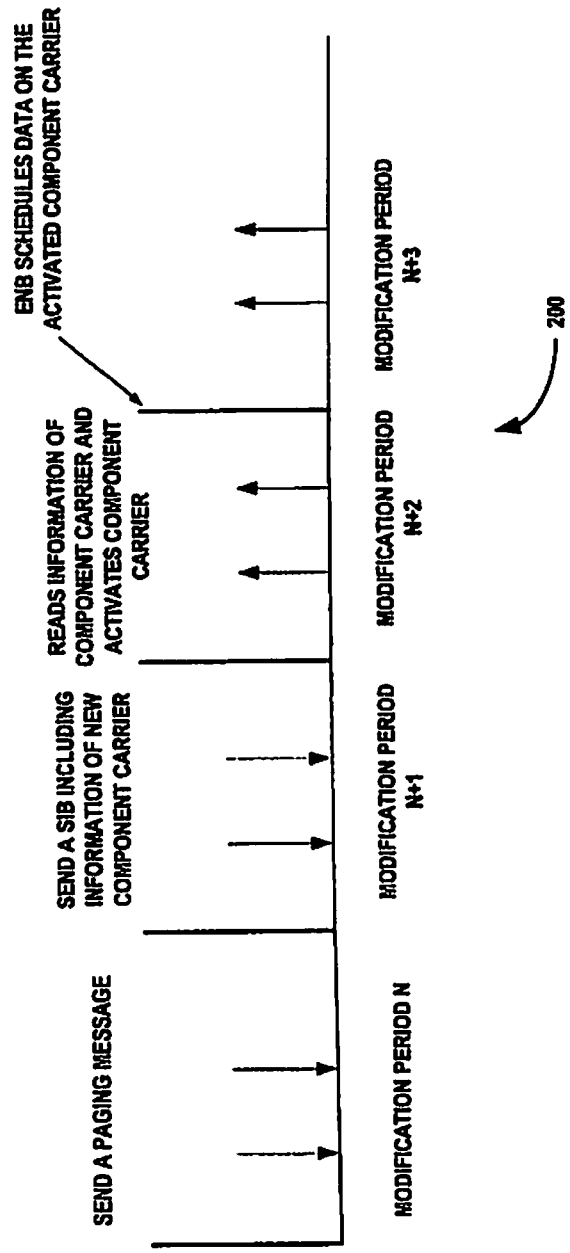
FIG. 2 is a diagram illustrating steps of activating a newly available CC, according to an embodiment of the present invention.

FIG. 2 is a diagram 200 illustrating steps of activating a newly available CC, according to an embodiment of the present invention. In FIG. 2, an LTE-A cell generates a paging message instructing the mobile stations to read updated system information of the LTE-A cell. The LTE-A cell then sends the paging message to the mobile stations during a modification period (N).

Further, LTE-A cell generates a system information block including information associated with CC. The information includes Absolute Radio-Frequency Channel Number (ARFCN) and a cell ID associated with the CC. In an embodiment of the present invention, information is included in a new information element of the system information block. The LTE-A cell then transmits the system information block including CC information to the mobile stations during a modification period (N+1), which follows the modification period (N). Each of the mobile stations acquires the system information block during the modification period (N+1).

The mobile stations read the information in the system information block and activate the CC for use based on the information in the system information block during the modification period (N+2), which follows the modification period (N+1). It is noted that, from the system information block, each of the mobile stations determines whether they need to monitor a Physical Downlink Control CHannel (PDCCH) of the newly activated CC(s). The eNB schedules data associated with the mobile stations on the newly activated CC at the end of the modification period (N+2).

Figure 3:
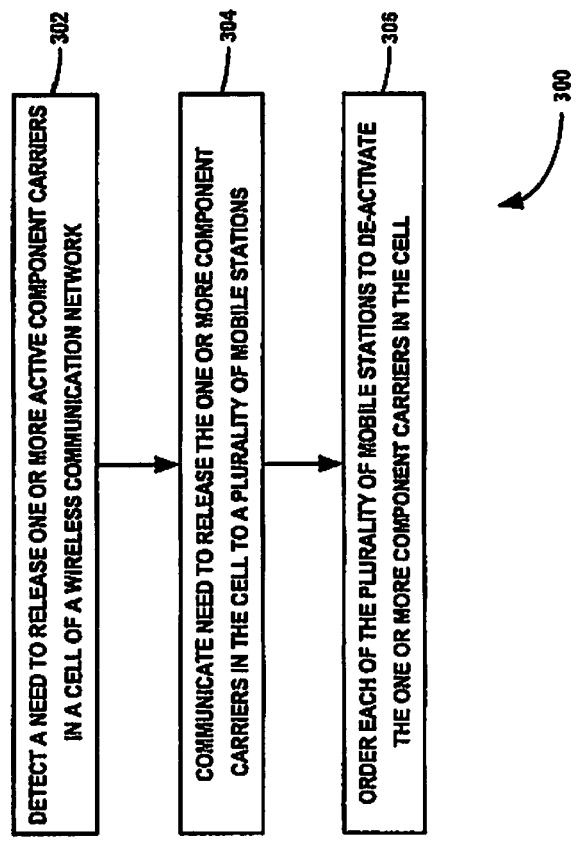
FIG. 3 is a flowchart illustrating a method of bulk deactivation of CCs in a wireless communication environment, according to an embodiment of the present invention.

FIG. 3 is a flowchart 300 illustrating a method of bulk deactivation of CCs in a wireless communication environment, according to an embodiment of the present invention. In step 302, a need to release CC(s) in a cell of a wireless communication network is detected. In step 304, release of the CC(s) in the cell is communicated to the mobile stations. In step 306, each of the mobile stations is ordered to deactivate the newly available CC(s) in the cell for data transmission.

Figure 4:
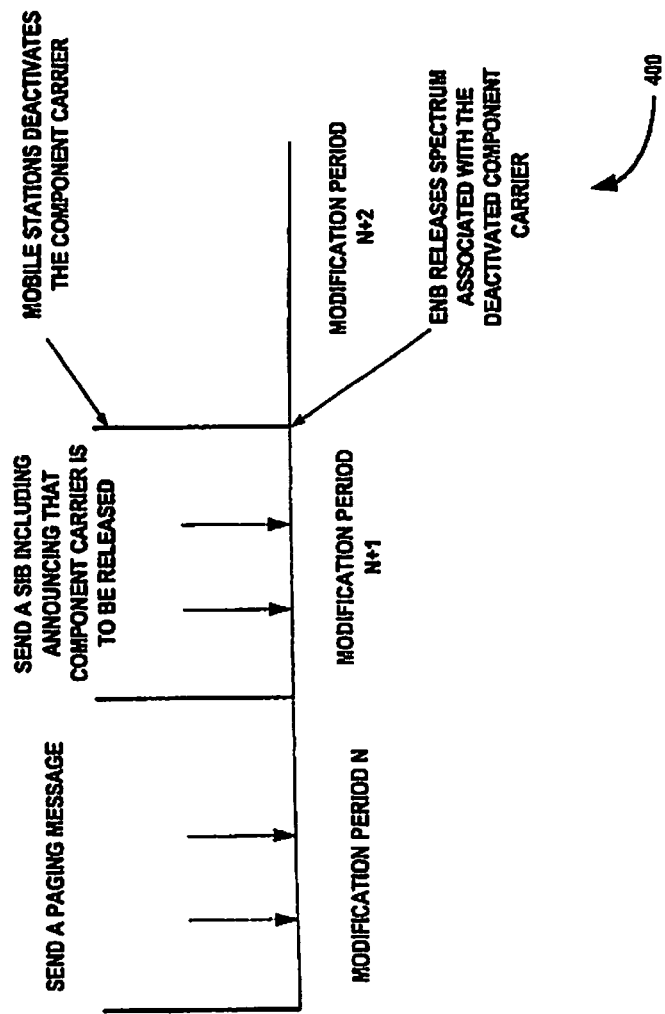
FIG. 4 is a diagram illustrating steps of deactivating the active CC, according to an embodiment of the present invention.

FIG. 4 is a diagram 400 illustrating steps of activating newly available CC, according to an embodiment of the present invention. The below steps are performed when the eNB detects a need to release the spectrum/CC currently in use. In FIG. 4, an LTE-A cell generates a paging message instructing the mobile stations to read updated system information of the LTE-A cell. The LTE-A cell then sends the paging message to the mobile stations during a modification period (N).

Further, LTE-A cell generates a system information block including information associated with the CC. The system information block indicates that the CC is not available from next modification period (N+2). In an embodiment of the present invention, information is included in a new information element of the system information block. The LTE-A cell then transmits the system information block including CC information to the mobile stations during a modification period (N+1) substantially following the modification period (N). Each of the mobile stations acquires the system information block during the modification period (N+1).

The mobile stations read the information in the system information block and deactivate the CC based on the information in the system information block at the end of the modification period (N+1). Also, the eNB releases the spectrum associated with the CC and implicitly stops scheduling data associated with the mobile stations on the deactivated CC from the start of the modification period (N+2).

Figure 5:
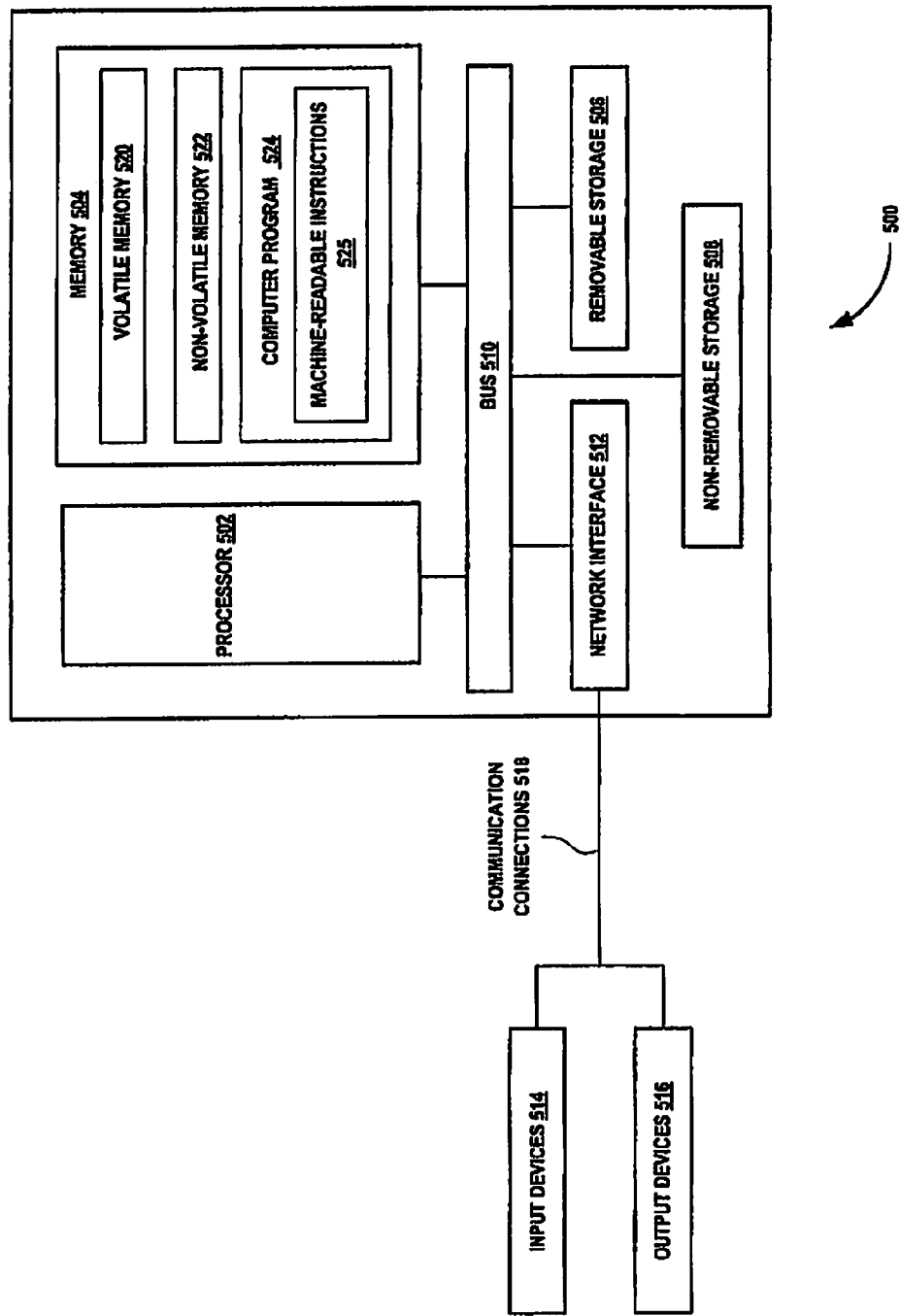
FIG. 5 is a diagram illustrating a base station or a LTE-A cell, according to an embodiment of the present invention.

FIG. 5 is a diagram illustrating a base station or an LTE-A cell 500, according to an embodiment of the present invention. FIG. 5 and its corresponding description provide a brief, general description of a suitable base station 500 in which embodiments of the present invention may be implemented.

The base station 500 includes a processor 502, a memory 504, a removable storage 506, and a non-removable storage 508. The base station 500 additionally includes a bus 510 and a network interface 512. The base station 500 has access to one or more user input devices 514, one or more output devices 516, and one or more communication connections 518, such as, for example, a network interface card or a universal serial bus connection. The one or more user input devices 514 may be embodied as keyboard or mouse, for example. The one or more output devices 516 may be embodied as a display of the base station 500. The communication connections 518 may include, for example, a wireless communication network such as UTRAN.

The memory 504 includes a volatile memory 520 and a non-volatile memory 522. A variety of computer-readable storage media may be stored in and accessed from the memory elements of the base station 500, such as, for example, the volatile memory 520 and the non-volatile memory 522, the removable storage 506 and the non-removable storage 508. Computer memory elements may include any suitable memory device(s) for storing data and machine-readable instructions, such as, for example, a read only memory, a random access memory, an erasable programmable read only memory, an electrically erasable programmable read only memory, a hard drive, a removable media drive for handling compact disks, digital video disks, diskettes, magnetic tape cartridges, and memory cards.

The processor 502, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 502 may also include, for example, embedded controllers, such as generic or programmable logic devices or arrays, application specific integrated circuits, single-chip computers, and smart cards.

Embodiments of the present invention may be implemented in conjunction with program modules, including functions, procedures, data structures, and application programs, for performing tasks, or defining abstract data types or low-level hardware contexts. Machine-readable instructions stored on any of the above-mentioned storage media may be executable by the processor 502 of the base station 500. For example, a computer program 524 may include machine-readable instructions 525 capable of communicating availability/unavailability of CC(s) in a cell, according to the embodiments of the present invention. In an embodiment of the present invention, the computer program 524 may be included on a Compact Disk-Read Only Memory (CD-ROM) and loaded from the CD-ROM to a hard drive in the non-volatile memory 522. The machine-readable instructions may cause the base station 500 to encode according to the embodiments of the present invention.

While the invention has been shown and described with reference to certain embodiments thereof, it will be understood by those skilled in the art that various changes in form and detail may be made therein without departing from the spirit and scope of the invention as defined by the appended claims. Furthermore, the various devices, modules, selectors, estimators, and the like described herein may be enabled and operated using hardware circuitry, such as, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as an application specific integrated circuit.

The invention claimed is:

1. A method of communicating availability of one or more component carriers in a cell, the method comprising the steps of:
    determining the one or more component carriers that are available in the cell of a wireless communication network;
    communicating availability of the one or more component carriers in the cell to a plurality of mobile stations; and
    allowing each of the plurality of mobile stations to use the one or more component carriers in the cell,
    wherein communicating availability of the one or more component carriers in the cell to the plurality of mobile stations comprises:
    sending a notification message instructing the plurality of mobile stations to read updated system information of the cell during a first modification period; and
    sending a system information block comprising information associated with the one or more component carriers to the plurality of mobile stations during a second modification period, which follows the first modification period.

2. The method of claim 1, wherein determining the one or more component carriers available in the cell of the wireless communication network comprises:
    performing spectrum farming to identify an available spectrum associated with the cell; and
    using the available spectrum as the one or more component carriers in the cell.

3. The method of claim 1, wherein allowing each of the plurality of mobile stations to use the one or more component carriers in the cell comprises:
    activating the one or more component carriers associated with the cell by each of the plurality of mobile stations based on the information associated with the one or more component carriers during a third modification period, which follows the second modification period.

4. The method of claim 3, wherein allowing each of the plurality of mobile stations to use the one or more component carriers in the cell further comprises:
    scheduling the plurality of mobile stations on the cell associated with the one or more component carriers at an end of the third modification period.

5. The method of claim 1, wherein the notification message comprises a paging message.

6. An article of manufacture for communicating availability of one or more component carriers in a cell, comprising a non-transitory computer-readable storage medium having instructions stored therein, which when executed, implement the steps of:
    determining the one or more component carriers that are available in the cell of a wireless communication network;
    communicating availability of the one or more component carriers in the cell to a plurality of mobile stations; and
    allowing each of the plurality of mobile stations to use the one or more component carriers in the cell,
    wherein communicating availability of the one or more component carriers in the cell to the plurality of mobile stations comprises:
    sending a notification message instructing the plurality of mobile stations to read updated system information of the cell during a first modification period; and
    sending a system information block comprising information associated with the one or more component carriers to the plurality of mobile stations during a second modification period, which follows the first modification period.

7. An apparatus for communicating availability of one or more component carriers in a cell, the apparatus comprising:
    a memory configured to temporarily store instructions; and
    at least one processor coupled to the memory and operative to: (i) determine the one or more component carriers that are available in the cell of a wireless communication network; (ii) communicate availability of the one or more component carriers in the cell to a plurality of mobile stations; and (iii) allow each of the plurality of mobile stations to use the one or more component carriers in the cell, wherein the operation of communicating availability of the one or more component carriers in the cell to the plurality of mobile stations comprises:

sending a notification message instructing the plurality of mobile stations to read updated system information of the cell during a first modification period;

sending a system information block comprising information associated with the one or more component carriers to the plurality of mobile stations during a second modification period, which follows the first modification period.

8. The apparatus of claim 7, wherein the operation of determining the one or more component carriers that are available in the cell of the wireless communication network comprises:

performing spectrum farming to identify an available spectrum associated with the cell; and using the available spectrum as the one or more component carriers in the cell.

9. The apparatus of claim 7, wherein the operation of allowing each of the plurality of mobile stations to use the one or more component carriers in the cell comprises:

activating the one or more component carriers associated with the cell by each of the plurality of mobile stations based on the information associated with the one or more component carriers during a third modification period, which follows the second modification period.

10. The apparatus of claim 9, wherein allowing each of the plurality of mobile stations to use the one or more component carriers in the cell further comprises:

scheduling the plurality of mobile stations on the cell associated with the one or more component carriers at an end of the third modification period.

11. The apparatus of claim 7, wherein the notification message comprises a paging message.

12. A method of communicating removal of component carriers in a cell, the method comprising the steps of:

detecting a need to release one or more component carriers that are active in the cell of a wireless communication network;

communicating the need to release the one or more component carriers in the cell to a plurality of mobile stations; and allowing each of the plurality of mobile stations to de-activate the one or more component carriers in the cell, wherein communicating the need to release the one or more component carriers in the cell to the plurality of mobile stations comprises:

sending a notification message instructing the plurality of mobile stations to read updated system information of the cell during a first modification period; and sending a system information block comprising information associated with the one or more component carriers to the plurality of mobile stations during a second modification period, which follows the first modification period.

13. The method of claim 12, wherein allowing each of the plurality of mobile stations to de-activate the one or more component carriers in the cell comprises:

de-activating the one or more component carriers associated with the cell by each of the plurality of mobile stations based on the information associated with the one or more component carriers at an end of the second modification period.

14. The method of claim 13, wherein the notification message comprises a paging message.

15. An article of manufacture for communicating removal of component carriers in a cell, comprising a non-transitory computer-readable storage medium having instructions stored therein, which when executed, implement the steps of:

detecting a need to release one or more component carriers that are active in the cell of a wireless communication network;

communicating the need to release the one or more component carriers in the cell to a plurality of mobile stations; and allowing each of the plurality of mobile stations to de-activate the one or more component carriers in the cell, wherein communicating the need to release the one or more component carriers in the cell to the plurality of mobile stations comprises:

sending a notification message instructing the plurality of mobile stations to read updated system information of the cell during a first modification period; and sending a system information block comprising information associated with the one or more component carriers to the plurality of mobile stations during a second modification period, which follows the first modification period.

16. An apparatus for communicating removal of component carriers in a cell, the apparatus comprising:

a memory configured to temporarily store instructions; and at least one processor coupled to the memory and operative to: (i) detect a need to release one or more component carriers that are active in the cell of a wireless communication network; (ii) communicate the need to release the one or more component carriers in the cell to a plurality of mobile stations; and (iii) allow each of the plurality of mobile stations to de-activate the one or more component carriers in the cell, wherein the at least one processor communicates the need to release the one or more component carriers in the cell to the plurality of mobile stations by:

sending a notification message instructing the plurality of mobile stations to read updated system information of the cell during a first modification period; and sending a system information block comprising information associated with the one or more component carriers to the plurality of mobile stations during a second modification period, which follows the first modification period.

* * * * *